US007773737B2

(12) United States Patent
Lederer

(10) Patent No.: US 7,773,737 B2
(45) Date of Patent: Aug. 10, 2010

(54) METHOD AND MODULE FOR DIRECT DIALING

(75) Inventor: Thomas Lederer, München (DE)

(73) Assignee: Siemens Aktiengesellschaft, Munich (DE)

( * ) Notice: Subject to any disclaimer, the term of this patent is extended or adjusted under 35 U.S.C. 154(b) by 1271 days.

(21) Appl. No.: 10/882,100

(22) Filed: Jun. 29, 2004

(65) Prior Publication Data

US 2005/0018830 A1    Jan. 27, 2005

(30) Foreign Application Priority Data

Jul. 4, 2003 (DE) ................. 103 30 281

(51) Int. Cl.
H04M 3/42 (2006.01)

(52) U.S. Cl. ............... 379/201.01; 455/412.2
(58) Field of Classification Search ............ 379/201.01, 379/201.1; 455/414.2
See application file for complete search history.

(56) References Cited

U.S. PATENT DOCUMENTS

| | | | | |
|---|---|---|---|---|
| 6,058,415 A * | 5/2000 | Polcyn | ............... | 709/200 |
| 6,185,283 B1 * | 2/2001 | Fuller et al. | ............... | 379/88.21 |
| 6,731,735 B1 * | 5/2004 | Cook | ............... | 379/207.11 |
| 6,944,283 B1 * | 9/2005 | Klein | ............... | 379/355.04 |
| 6,947,536 B2 * | 9/2005 | Sinclair | ............... | 379/201.01 |
| 6,978,136 B2 * | 12/2005 | Jenniges et al. | ............... | 455/435.1 |
| 7,007,239 B1 * | 2/2006 | Hawkins et al. | ............... | 715/780 |
| 7,023,980 B2 * | 4/2006 | Lenard | ............... | 379/266.07 |
| 7,076,043 B2 * | 7/2006 | Curbow et al. | ............... | 379/201.06 |
| 7,123,696 B2 * | 10/2006 | Lowe | ............... | 379/88.16 |
| 7,269,162 B1 * | 9/2007 | Turner | ............... | 370/352 |
| 7,469,384 B2 * | 12/2008 | Thompson et al. | ............... | 715/758 |
| 2003/0185360 A1 * | 10/2003 | Moore et al. | ............... | 379/114.01 |
| 2004/0062374 A1 * | 4/2004 | Lund | ............... | 379/218.01 |

FOREIGN PATENT DOCUMENTS

| | | |
|---|---|---|
| DE | 3437 773 A1 | 4/1986 |
| DE | 41 11 300 A1 | 10/1992 |
| DE | 44 20 462 A1 | 12/1995 |
| DE | 197 43 201 A1 | 4/1999 |
| DE | 199 51 827 A1 | 5/2001 |
| DE | 101 33 829 A1 | 11/2002 |
| DE | 10147770 A1 | 4/2003 |
| DE | 10153 946 A1 | 5/2003 |
| DE | 101 55 431 A1 | 6/2003 |
| EP | 0 980 175 A2 | 2/2000 |
| EP | 1313330 A1 | 5/2003 |
| WO | WO 98/48555 | 10/1998 |

* cited by examiner

Primary Examiner—Simon Sing

(57) ABSTRACT

Method and module for the direct dialing from a first subscriber with a first terminal (1) in a telephone system (20a) to a second subscriber with a number of terminals from which at least one is connected outside the telephone system (20a) in which case availability information (14) about the second subscriber is requested by an availability service (24) that is connected outside the telephone system (20a) and at least parts of the availability information (14) are made accessible to the first subscriber at the first terminal (1) allocated to a direct dialing function (11, 12, 15) in order to set up a connection attempt to the connection of the second subscriber that has the highest probability of success in view of the availability information.

21 Claims, 4 Drawing Sheets

METHOD AND MODULE FOR DIRECT DIALING

CROSS REFERENCE TO RELATED APPLICATIONS

This application claims priority to the German application No. 10330281.6, filed Jul. 4, 2003 and which is incorporated by reference herein in its entirety.

FIELD OF INVENTION

The invention relates to a method for the direct dialing from a first subscriber with a first terminal in a telephone system to a second subscriber with a number of terminals of which at least one is connected outside the telephone system.

BACKGROUND OF INVENTION

In many telephone systems, the telephony terminals provide the option of dialing the desired subscriber by using the direct dialing keys. For this purpose the dialing keypad offers a series of keys that can be configured for connection to a specific subscriber. Sometimes dialing such a direct dialing function within a private telephone system shows whether the connection is busy at the desired subscriber. In addition, in such private systems an LED next to each direct dialing key can continuously signal information about the busy state of the associated subscriber.

In practice, a single direct dialing key is usually not sufficient for each subscriber because almost every subscriber can be reached via a number of connections, for example, at the office, private or mobile. Therefore, in a conventional solution, a number of direct dialing keys are assigned to one single subscriber. As a result both the clarity on the keypad is reduced and it is not possible to make optimum use of the existing keys for as many subscribers as possible. Therefore, by using an toggle key, at least two possible call numbers are assigned to one single key. However, even in the above mentioned simple example of connections at the office, private or mobile, the two dialing options provided by toggling are insufficient.

Therefore, actuating the direct dialing key frequently does not make a connection to the desired subscriber because the line is busy or the dialed subscriber is unavailable under the selected number. In the case of conventional methods, the busy state can then at most be read at the LED provided the subscriber's line is in the same private telephone system. Therefore, this functionality is restricted to the limited circle of possible subscribers and cannot be used beyond the boundaries of the private telephone system.

In addition, availability of the subscriber cannot be interrogated via direct dialing keys in conventional telephone systems and the busy state the user does not provide the user with any information about the availability of the desired subscriber. At least one availability service is indeed frequently provided within a company. However, it is not accessible via the telephone system. This means that important additional information about the availability of the subscriber such as "in a meeting", "on holiday", "represented by . . ." cannot be accessed with the direct dialing key.

SUMMARY OF INVENTION

The object of the invention is therefore to specify a method and a device that allow the user a quick overview of the availability of desired subscribers together with a direct dialing function. In addition, a direct dialing method should also be specified by means of which a connection to the desired subscriber is set up with the fewest possible steps.

The solution according to the invention envisages providing the user at their telephony terminal with availability information of possible desired subscribers. To do this it refers back to another availability service that already exists elsewhere that interrogates information across the boundaries of private telephone systems, if required. This overview can either be executed after selecting a specific subscriber by a direct dialing function, but also by a continuous display.

In addition, the invention also makes it possible to give the user, in a relatively independent representation, a selection of connections for each desired subscriber in the simplest possible way. As a result, this can also include connections by means of which the subscriber can only be reached indirectly or by means of which only a representative can be reached. With the availability information, a call attempt can be made from this selection list to a line that has a correspondingly high success probability.

Detailed specifications of the invention are given in the independent claims as well as in their advantageous further developments in the dependent claims.

In accordance with the these claims, a direct dialing method is provided for which the availability information about the desired subscriber is requested from an availability service that is connected outside the telephone system and at least parts of the availability information are made accessible to the user at their terminal. In addition, the method according to the invention provides that after a direct dialing function has been actuated, a list of the terminals and connections that is allocated to the desired subscriber is shown.

In addition, a module for the terminal is provided in an internal telephone system with an actuating device for a direct dialing method and with an output unit for the availability information, in which case the module is connected to an availability service outside the telephone system in order to request availability information and connected to the output unit of the terminal to present this availability information at least partially via the output unit. This module is also suitable for displaying a list of connections of the desired subscriber after the direct dialing function has been activated.

A further development of the method according to the invention provides for a connection to be set up to a connection selected from the list after the availability information has been evaluated. This guarantees that data for possible connections of the desired subscriber exists and when one of these connections is selected, the current availability is considered. Consequently, an attempt is made to set up a connection directly to the number under which, according to the knowledge about their availability, the desired subscriber can most probably be reached.

Advantageously the list and/or the availability information is made accessible to the user on a display or via automated voice output. As a result, the user can access the required information which meets his needs depending on whether or not he would like to just glance at the information or listen to it if he cannot see a display because of personal or external circumstances.

The user preferably selects the desired subscriber from the list via keys, voice or a multi-frequency dial tone. Dialing by the user also allows more complex availability information or special preferences of the user to be taken into consideration. The different input possibilities can be requested, on the one hand, so that the input and output mediums match one another and, on the other hand, depending on the situation represent the quickest or most comfortable input option.

Especially preferred is the automatic selection of the desired subscriber from the list by an application. In this case, the user only actuates the direct dialing function and a connection attempt is performed without any other action which also takes account of the availability information.

Advantageously the list allocated to the desired subscriber with the direct dialing function can be configured by the user or the desired subscriber. Therefore, precisely those numbers desired by those involved can be recorded in the list. As an alternative and an extension, the list to be allocated to the desired subscriber is preferably taken from an electronic address book. In this case, those concerned need not necessarily configure the list and its currency cannot fall behind that of the electronic directory.

Advantageously, at least parts of the availability information are continuously requested or continuously kept up-to-date by means of notification mechanisms (e.g. subscribe/notify) and continuously made accessible to the user. This results in no action by the user whatsoever to provide an overview of the availability of potential call partners that are important to him and to which he has therefore allocated a direct dialing function.

It is especially advantageous if the availability information is classified and the result is made accessible to the user via a binary representation. Such simple information can quickly be taken in by the user without having to evaluate all the availability information. This simplified information can easily be shown simultaneously for many potential subscribers.

A further development of the invention according to the module provides that the module is at least indirectly connected to a display or a loudspeaker of the output unit in order to display the availability information or for voice output. This gives the module the option of making the information available to the user in the desired form.

Advantageously, the module features a memory unit for the list of the terminals and lines of at least one possible second subscriber. In this memory unit the list preconfigured by the user can be stored and the selection criteria predefined by the user for automatic selection can also be recorded. In addition or alternatively, the module should preferably be connected to an electronic address book in order to request the list of terminals and connections of the second subscriber. As a result, the module can also access current and comprehensive address data that is not stored in the terminal itself.

In addition, the module should also preferably be connected to a selection unit for selecting the number from the list. With this, the user can quickly activate a module for a connection setup with that number he regards as the most suitable. To this end, the module is advantageously connected at least indirectly to a keypad, a microphone for voice input or a multi-frequency dial tone generator of the selection unit. This provides the user with a suitable input interface to the module.

The module preferably has a classification unit for the availability information. With this, the availability information can be reduced to important information which the user can take in easily and quickly.

In particular, the module should preferably be connected to a device for automatic selection of the number from the list. This device, with due consideration to the availability information, allows a convenient selection of the number under which the desired subscriber can be reached with the highest probability without any effort by the user.

Advantageously, the device for automatic selection is integrated into the module. Therefore, a device that is advantageous for the functioning of the module is a component thereof, which results in a more complete module and increased clarity of the telephony terminal.

BRIEF DESCRIPTION OF THE DRAWINGS

The invention is also described below in respect of additional advantages and characteristics as an example and with reference to the accompanying drawings. The drawings show.

DETAILED DESCRIPTION OF INVENTION

Figure 1:
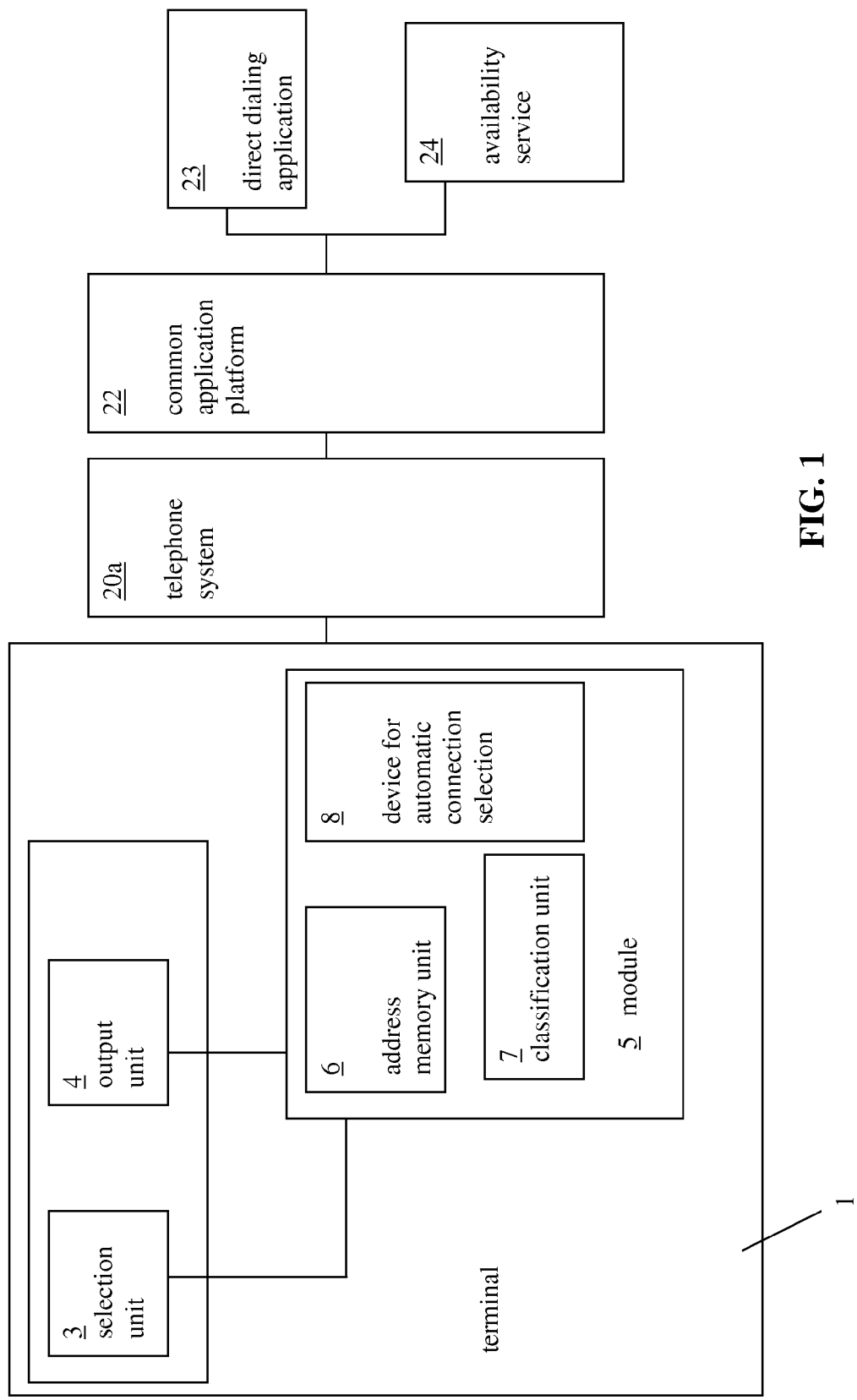
FIG. 1 a block diagram of a telephone system with a telephony terminal for the direct dialing method according to the invention, FIG. 2 the selection keypad and display of the telephony terminal according to FIG. 1, FIG. 3 a diagram of the integration of the telephony terminal into a telephone system, FIG. 4 a flowchart of a connection setup according to a first embodiment of the invention and FIG. 5 a flowchart of a connection setup according to a second embodiment of the invention.

As explained in FIG. 1, a telephony terminal 1 for the direct dialing method according to the invention has an operating and a display panel 2 in which a selection unit 3 and an output unit 4 are arranged. A module 5 in the telephony terminal 1 is connected to the selection unit 3 and the output unit 4. This module 5 includes an address memory unit 6, a classification unit 7 as well as a device for the automatic connection selection 8 to which it is connected in each case.

The telephony terminal 1 is connected via module 5 to a telephone system 20a that on its part is connected via a common application platform 22 to a direct dialing application 23 and an availability service 24.

Figure 2:
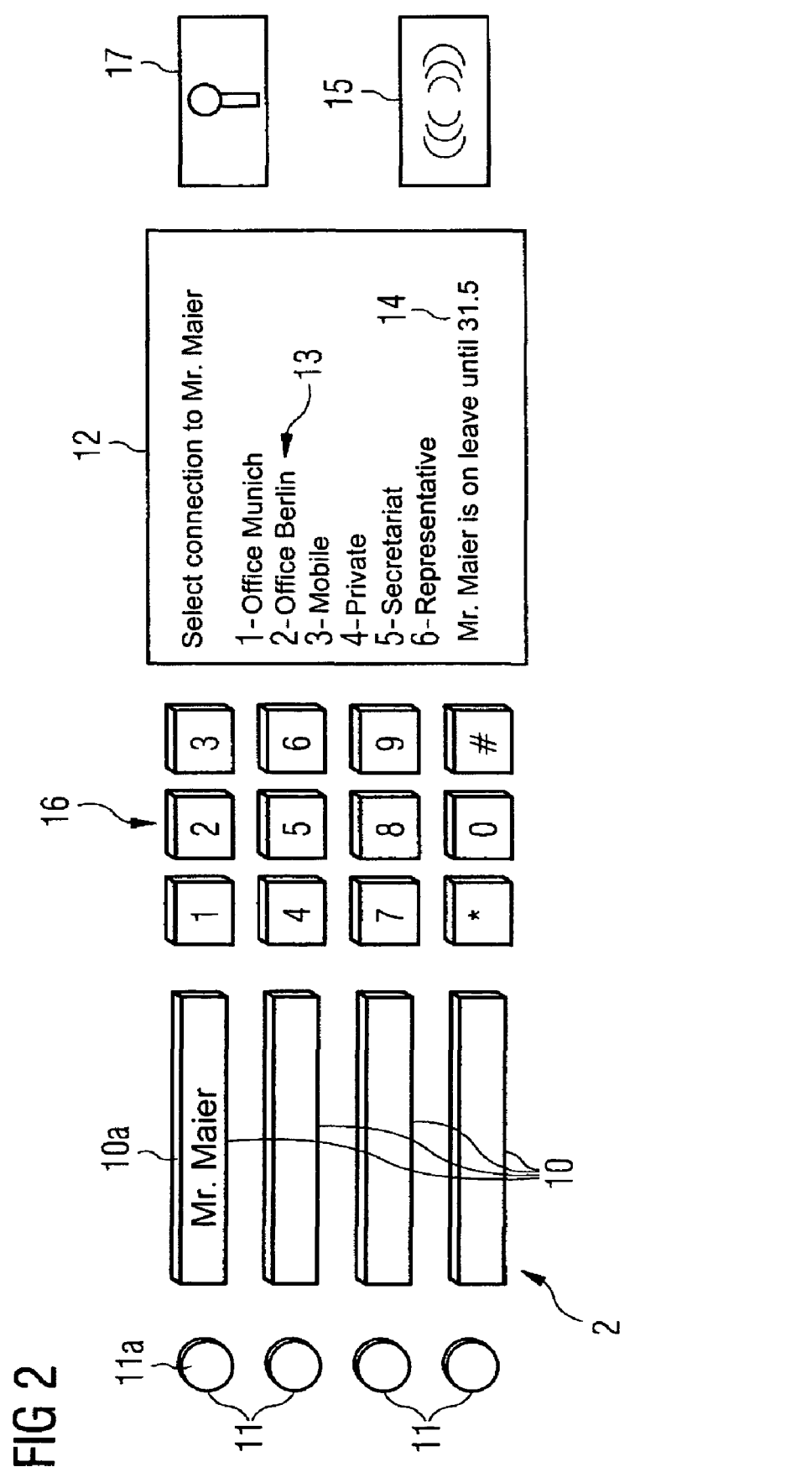

As shown in FIG. 2, the operating and display panel 2 of the telephony terminal 1 has many direct dialing keys 10 that are allocated to a subscriber in each case. An LED 11 that is arranged next to the associated direct dialing key 10 is allocated to each direct dialing key 10. In a method explained in greater detail below, the status of the LEDs 11 corresponds to the availability of the subscriber of the associated direct dialing key 10.

In FIG. 1, after a direct dialing key has for example been actuated, the direct dialing key 10a, a selection list 13 of the possible connections of the subscriber allocated to the direct dialing key 10a as well as the availability information 14 are shown on display 12. This information 13, 14 shown as text on display 12 can alternatively or additionally also be output by means of an automatic voice output via a loudspeaker 15. A keypad 16 and a microphone 17 are used to enter additional user instructions. Instead of the loudspeaker 15 and the microphone 17 fitted to the telephony terminal 1, alternatively also loudspeakers and microphones of the handset of the telephony terminal 1 that are not shown are also used.

Figure 3:
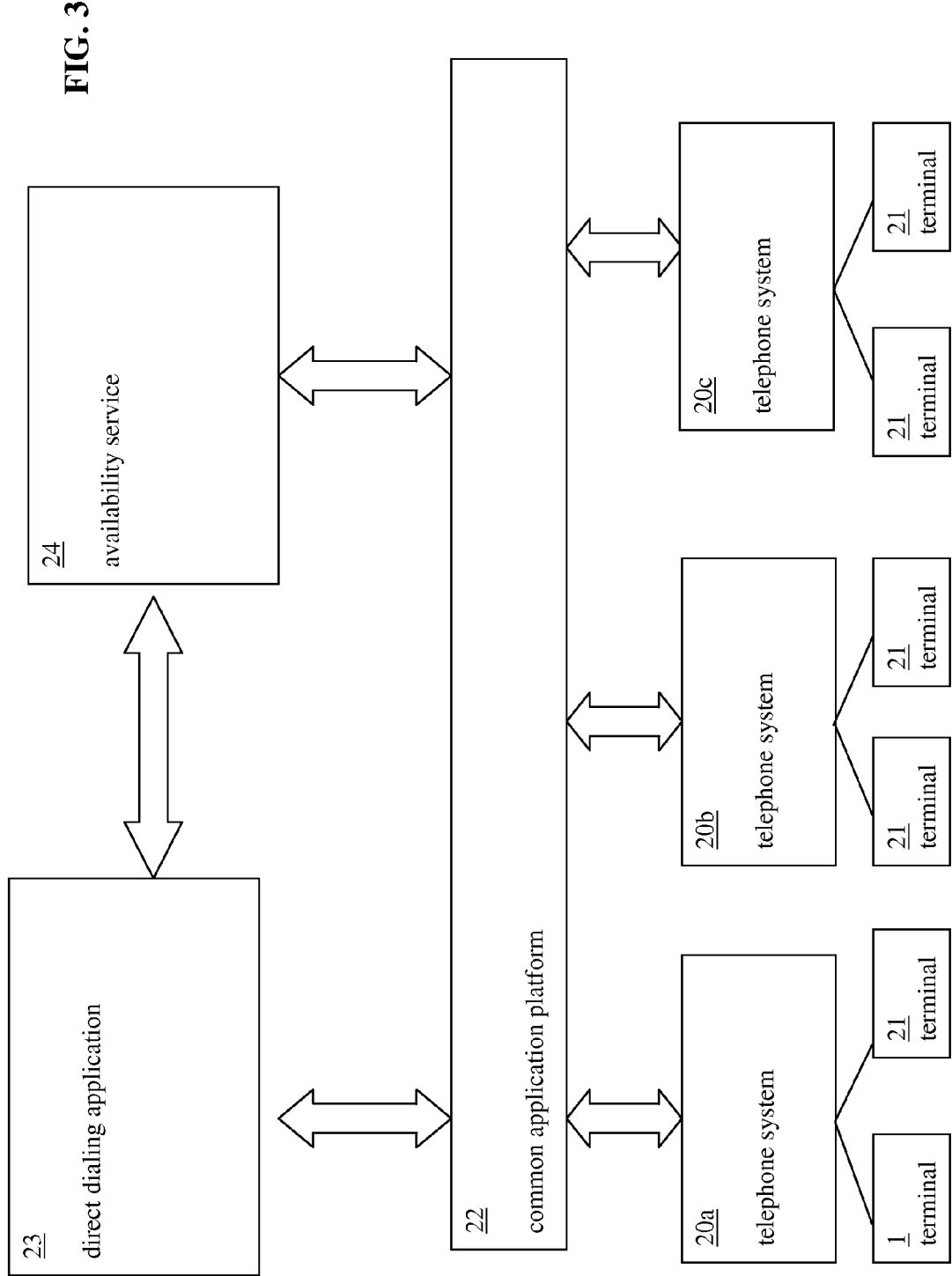

FIG. 3 shows the integration of the telephony terminal 1 into a telephone system in greater detail. The telephony terminal 1 is connected to a telephone system 20a. Many additional telephony terminals 21 are sometimes connected to the same telephone system 20a and sometimes to additional telephone systems 20b, 20c. All the telephone systems 20a-20c are connected to a common application platform 22.

The application platform 22 serves to integrate the telephone systems 20a-20c with each another and with the network protocols. In particular, the application platform 22 is connected to a direct dialing application 23 that answers the request of a desired subscriber about possible connections with a selection list 13 and provides the availability information 14 of the desired subscriber to an availability service 24. The direct dialing application 23 can then refer to an address book by means of LDAP, for example, an in-house or a general telephone book. In practice, the availability service 24 is then often used at the same time as a system for storing the presence times.

The availability information 14 of the availability service 24 is shown, on the one hand, in the display 12 of the telephony terminal 1 after a direct dialing key 10 has been actuated. Module 5 can also continuously and independently of the actuation of the direct dialing keys 10 request the availability service 24. The availability information 14 of the subscriber allocated to each direct dialing key 10, is classified by the classification unit 7 in module 5 in two groups of which the one is "available" and the other one "unavailable" and according to the detected class and module 5 switches the associated LED 11 on or off.

In this case, the class definition for "available" can be configured freely in the classification unit 7 in order to give semantics to the LED that can be selected; one possibility being for example be that "available" means that the subscriber is present or alternatively the subscriber is not on holiday or alternatively the subscriber is online, or alternatively the subscriber has set his availability in such a way that he would like to take calls directly. The class definition for "unavailable" can also be configured, but preferably specified via the complement in each case.

Figure 4:
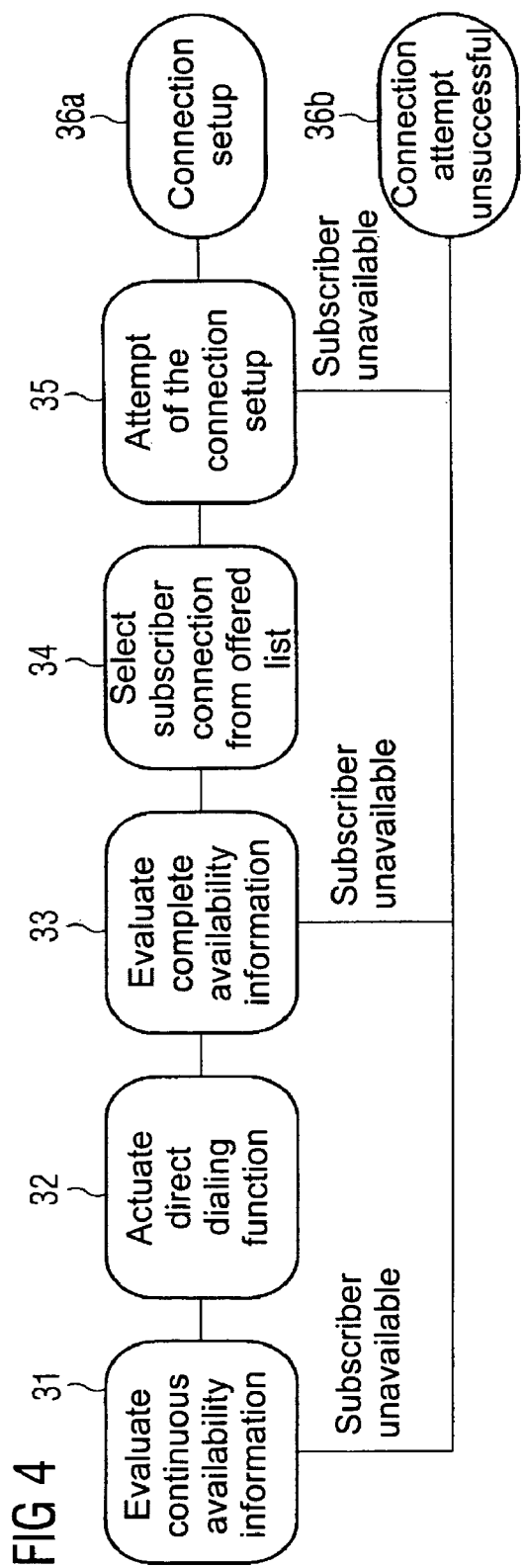

On the basis of the schematic flowchart in FIG. 4 and with reference to the telephony terminal 1 shown in FIGS. 1 and 2, the direct dialing method is explained in detail below according to a first embodiment of the invention.

The user checks (step 31) by means of the corresponding LED 11 whether or not the desired subscriber is available. In the example shown in FIG. 1, the LED 11*a* is authoritative because it is allocated to the desired subscriber. If the LED 11*a* shows that the desired subscriber is unavailable, the user will most probably not even try to set up a connection. If the desired subscriber is available according to LED 11*a*, the user actuates the direct dialing key 10*a* (step 32) allocated to the subscriber.

After the direct dialing key 10*a* has been actuated, the operating and input panel 2 of the telephony terminal 1 is exactly in the state shown in FIG. 2. Display 12 then shows a selection list 13 of possible connections of the subscriber selected via the direct dialing key. On the one hand, this information can be preconfigured at an earlier point in time and be called up from the memory unit 6 or directly made available by the direct dialing application 23 (e.g. via an LDAP request).

In addition to the selection list 13, the telephony terminal 1 also shows the availability information 14 of the desired subscriber in display 12. The availability information 14 is made available by the availability service 24 and is requested by module 5 via the common application platform 22. The user evaluates the availability information 14 and possibly establishes that no connection attempt should be made, for example, because one of the connections of the desired subscriber is busy or the subscriber is on leave (step 33).

With due consideration of the availability information 14, the user selects one of the connections of the desired subscriber offered in list 13. This takes place simply by pressing a selection key 16, but can alternatively also be carried out by means of voice recognition or a multi-frequency tone with a microphone 17. The selected connection can also be a representative such as the secretariat, the exchange, the person's superior or family members (step 34).

Module 5 tries to set up the connection (step 35). If it is successful, a connection is set up (step 36*a*). However, the connection attempt can also fail (step 36*b*), for example, because the subscriber is absent for the short-term or because he has not maintained the information for the availability service 24.

By using only two actions, namely, actuating the direct dialing key 10*a* and selecting one of the offered connections, the user has set up a connection attempt to the subscriber that on the basis of the LED 11 and the availability information 14 has a high success probability.

Figure 5:
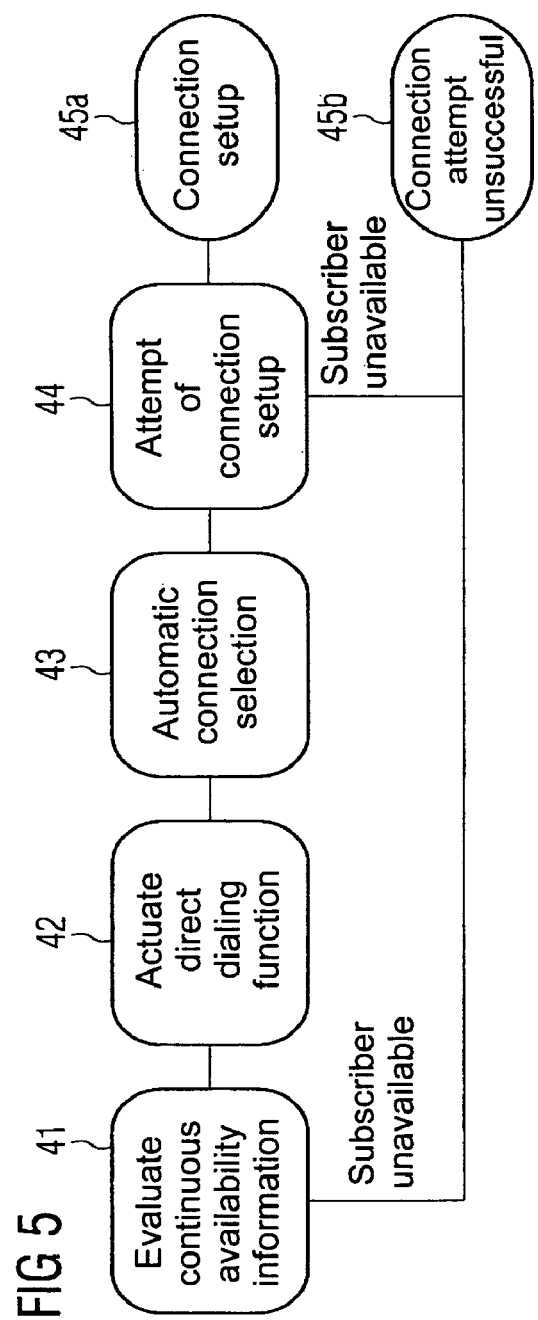

FIG. 5 shows a second embodiment of the direct dialing method according to the invention. In this case, in the same way as the first embodiment, the user first of all evaluates the continuous availability information 14 via LEDs 11 and possibly terminates the connection attempt immediately (step 41). Otherwise the user actuates the direct dialing key 10*a* (step 42).

Contrary to the first embodiment, module 5 indeed reads a selection list 13 from the memory unit 6 or requests it from the direct dialing application 23, as well as requesting the availability information 14 in the case of the availability service 24, but does not output it on the output unit 4 (step 43).

Instead, the device evaluates the availability information 14 for the automatic connection selection 8 in module 5 and module 5 tries to set up a connection to the connection determined in the device for the automatic connection selection 8 that reaches the desired subscriber with the highest probability (step 44) and that then either leads to a connection (step 45*a*) or remains unsuccessful (step 45*b*).

The device for the automatic number selection 8 can follow explicit instructions that the desired subscriber has stored in the availability service 24 and that module 5 requests there or that the user has configured and stored in the address memory unit 6 in which case the instructions can particularly be a fixed priority list.

However, the evaluation method in the device for the automatic number selection 8 can also be any other type of method. Further examples of fixed evaluation methods could be the most cost-effective connection (possibly mobile as the last option), a dependency of the time of day (private in the morning and in the evening, otherwise office), a refusal of specific connections (to mobile while the subscriber is in a meeting) or also an adaptive method that aligns its behavior in a learning fashion with the connections that have previously been opened successfully.

Alternatively, the device for the automatic connection selection 8 can also be allocated to the direct dialing application 23 instead of to module 5. In this case, the direct dialing application receives the direct dialing request from module 5. Module 5 then either also sends the selection list 13 read out from the memory unit 6 to the direct dialing application 23 or it requests it from an electronic address book. The direct dialing application 23 sends this list 13 of the device to the automatic connection selection 8 and receives as answer the connecting data of the selected subscriber. Subsequently, the direct dialing application 23 initiates a connection setup between terminal 1 and the subscriber.

Finally, a hybrid solution of the first two embodiments is also conceivable as the third embodiment in which the device for the automatic connection selection 8 as described in the second embodiment indeed determines a preferred connection, however, module 5 or the direct dialing application 23 does not dial it independently, but only first of all makes a proposal to the user. Therefore, this proposal can either be in the form of requesting a simple yes/no decision or by highlighting a connection in the selection list 13 according to the first embodiment while, for example, the proposal in the first place is shown on display 12 or is underlined. In the latter case, the selection of the user could be stored for an adaptive method in order to include the previous preferences in the proposal the next time.

Implementing a proposed method is also conceivable using purely software by using the available interfaces. In this way, the functions of the module 5 can be executed on a server, possibly together with the direct dialing application 23 and can, for example, be connected via a CSTA interface to one or more communication systems via the Internet protocol and it also controls display 12, the LEDs 11, keys 16 and also the calls. Therefore, the terminals can use the new functionality unchanged in this way in as far as the communication system allows controlling via a central interface.

If required, terminal 1 also has direct interfaces via which display 12, keys 16 and calls can be controlled.

All the embodiments have in common that information about the availability of the desired subscriber is made accessible to the user via LEDs 11 and the display 12 in a simple way. At the same time, with little or, in the case of the second embodiment, even a single action of the user, a connection attempt is set up to that subscriber number that matches the requests of the user and/or the subscriber and particularly with the highest probability achieves a successful connection setup between the user and the subscriber.

Although the invention is described on the basis of embodiments with a fixed combination of features it also includes feasible additional advantageous combinations of these features as specified particularly, but not exhaustively, in the subclaims.

The invention claimed is:

1. A method for direct dialing from a first subscriber with a first terminal in a telephone system to a second subscriber with a plurality of terminals wherein at least one of the plurality of terminals is connected outside the telephone system, the method comprising:
the first terminal requesting availability information about the second subscriber by an availability service that is connected outside the telephone system, the availability service being independent of direct dialing to the second subscriber;
the first terminal receiving the availability information for the second subscriber,
the first terminal identifying a plurality of connection options;
the first terminal requesting a direct dial connection to the second subscriber;
the first terminal using a module operatively connected to the first terminal to determine a best connection option from the plurality of connection options that is most likely to permit a successful connection to the second subscriber;
indicating the best connection option associated with a direct dialing key by illuminating an LED adjacent to the direct dial key associated with the best connection option;
actuating the direct dialing key associated with the best connection option such that the first terminal uses the best connection option determined by the module for use in attempting a connection to the second subscriber;
the first terminal attempting a connection to the second subscriber via the best connection option determined by the module; and
displaying a list of terminals associated with the second subscriber after actuation of the direct dialing key associated with the best connection option during the attempting of the connection to the second subscriber.

2. A method according to claim 1, wherein the determination of the best connection option is comprised of evaluating instructions the second subscriber provided to the availability service.

3. A method according to claim 1, wherein at least a portion of the availability information is continuously requested and made accessible to the first subscriber.

4. A method according to claim 1, wherein the determination of the best connection option is made by the module analyzing at least one evaluation method selected from the group consisting of cost-effectiveness, time of day dependency, refusal of certain connection options of the plurality of connection options, and adaptive methods configured to identify the best connection option based on connection options that previously provided successful connections to the second subscriber.

5. A method according to claim 1, wherein a second subscriber is selected by the first subscriber from a list via keys, voice or a multi-frequency dial tone.

6. A method according to claim 1, wherein the second subscriber is selected automatically by an application.

7. A method according to claim 1, wherein the plurality of connection options allocated to the second subscriber is provided by the first subscriber or the second subscriber.

8. A method according to claim 1, wherein the plurality of connection options is at least partially compiled from accessing an electronic address book.

9. The method of claim 1 wherein the best connection option is the connection option of the plurality of connection options that is determined by the module to have a highest probability of providing a successful connection to the second subscriber.

10. The method of claim 1 further comprising the module verifying that the best connection option should be used to attempt a connection with the second subscriber prior to attempting the connection to the second subscriber.

11. The method of claim 1 wherein the determination of the best connection option is made by the module analyzing at least two evaluation methods selected from the group consisting of cost-effectiveness, time of day dependency, refusal of certain connection options of the plurality of connection options, and adaptive methods configured to identify the best connection option based on connection options that previously provided successful connections to the second subscriber.

12. A terminal for use in a telephone system, the terminal comprising an actuating device for direct dialing and an indictor adjacent to the actuating device, the indicator being comprised of an LED that is adjustable from an active condition to an inactive condition, wherein
the terminal is also comprised of a module,
the module being configured for connection to an information source of the terminal to at least one of access and receive data allocated for direct dialing to a second subscriber;
the module being configured for connection to an availability service outside the telephone system in order to request availability information and receive availability information, the availability service being independent of direct dialing to the second subscriber;
the module being comprised of a selection unit configured to assess availability information for the second subscriber received from the availability service to determine a preferred connection option from a plurality of connection options for the second subscriber for a direct dial connection to the second subscriber;

the module configured to actuate the indicator adjacent to the actuating device corresponding to the preferred connection option to adjust the indicator to the active position; and the module configured to cause a display of a list of indicia indicating terminals associated with the second subscriber to occur after the actuating device corresponding to the preferred connection option is actuated and a connection via the preferred connection option is being attempted.

13. The terminal of claim 12, wherein the module is connected to a display or a loudspeaker in order to show information or for voice output.

14. The terminal of claim 12, wherein the module is configured to transmit the preferred connection option to the terminal for attempting a connection to the second subscriber.

15. The terminal of claim 12, further comprising:
a memory unit configured to store the availability information received from the availability service.

16. The terminal of claim 12, wherein the module is connected to an electronic address book in order to obtain the connection options for the second subscriber.

17. The terminal of claim 12, wherein the module is configured to send a verification request to the terminal to verify that the preferred connection option is selected by the selection unit.

18. The terminal of claim 17, wherein the module is connected at least indirectly to a keypad, a microphone for voice input or a multi-frequency dial tone generator such that a verification response can be received by the module, the verification response verifying that the preferred connection option was correctly determined or indicating that the preferred connection option is not the preferred connection option.

19. The terminal of claim 12, wherein the selection unit is configured to determine the preferred connection option using at least one evaluation method selected from the group consisting of cost-effectiveness, refusal of certain connection options of the plurality of connection options, and adaptive methods configured to identify the best connection option based on connection options that previously provided successful connections to the second subscriber.

20. The terminal of claim 19, wherein the selection unit is integrated in the module.

21. The terminal of claim 12 wherein the preferred connection option is a connection option of the plurality of connection options that is determined by the selection unit to have a highest probability of providing a successful connection to the second subscriber.

* * * * *